May 2, 1967  C. W. DAMES, JR  3,317,646
METHOD FOR CASTING NYLON
Filed Sept. 30, 1963
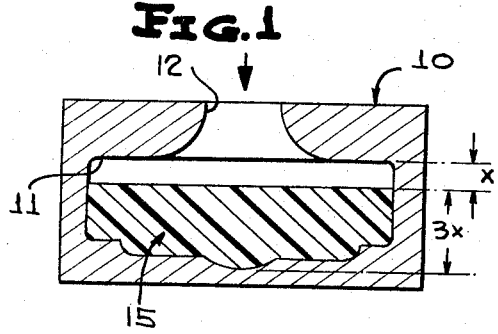
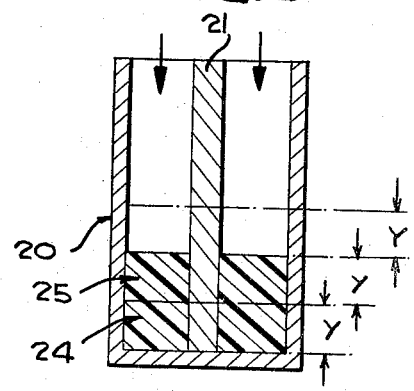
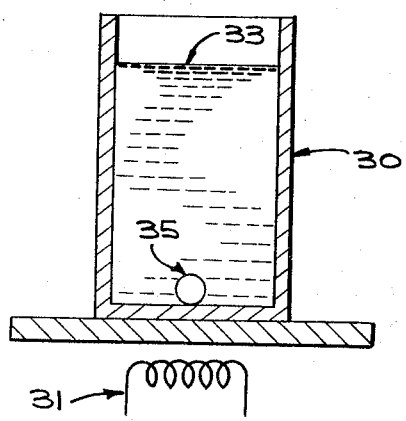
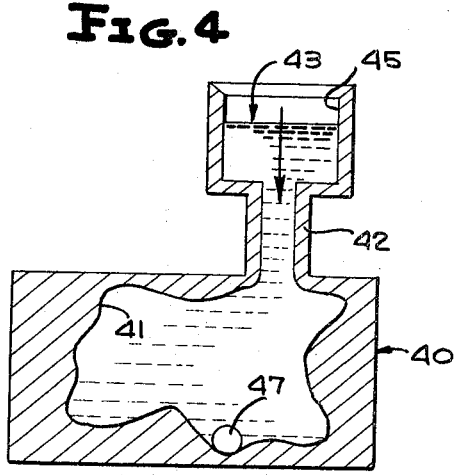
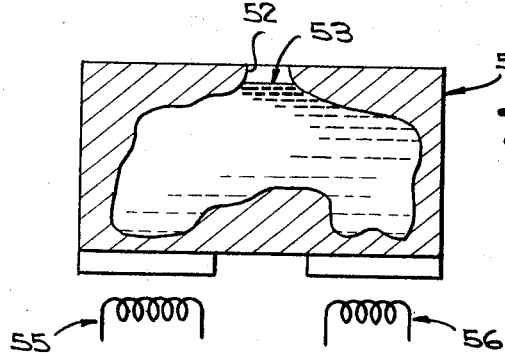
INVENTOR.
CARL W. DAMES, JR.
BY
ATTORNEY 3,317,646
METHOD FOR CASTING NYLON
Carl W. Dames, Jr., Reading, Pa., assignor, by mesne assignments, to The Polymer Corporation, a corporation of Pennsylvania
Filed Sept. 30, 1963, Ser. No. 312,529
4 Claims. (Cl. 264—308)

This invention relates to the formation of polylactam shapes by polymerizing higher lactams, in situ, in molds by utilizing low temperature anionic polymerization processes. More particularly, this invention relates to methods for the polymerization casting of polylactams, whereby closer dimensional tolerances are maintained, the formation of voids and bubbles is minimized, and stresses in the cast article are reduced.

The low temperature anionic polymerization of lactams referred to above is disclosed, for example, in U.S. Patents 3,015,652; 3,017,391; 3,017,392 and 3,018,273.

Briefly, the above patents disclose the novel polymerization of higher lactams, i.e., lactams containing at least six carbon atoms in the lactam ring, as for example, e-caprolactam, enantholactam, caprylolactam, decanolactam, undecanolactam, dodecanolactam, pentadecanolactam, hexedecanolactam, methylcyclohexamone isoximes, cylcic hexamethylene adipamide and the like, and mixtures thereof; in the presence of an anionic polymerization catalyst, as for example, alkali and alkaline earth metals such as lithium, sodium, potassium, magnesium, calcium, strontium, etc., either in metallic form or in the form of hydrides, borohydrides, oxides, hydroxides, carbonates, etc., organo-metallic derivatives of the foregoing metals, as well as other metals, such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds such as ethyl magnesium chloride, methyl magnesium bromide, phenyl magnesium bromide and the like; and a promoter compound such as organic isocyanates, ketenes, acid chlorides, acid anhydrides, and N-substituted imide having the structural formula

wherein A is an acyl radical such as carbonyl, thiocarbonyl, sulfinyl, phosphinyl and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1000.

This polymerization of the higher lactams is initiated at temperatures of from about the melting point of the lactam monomer to about 250° C., and preferably from about 125° to about 200° C. As the reaction is exothermic, the initiation temperature will be exceeded under most conditions. The amount of catalyst and promoter compound each can vary from about 0.01 to about 20 mole percent, preferably from about 0.05 to about 5 mole percent, all based on the higher lactam being polymerized. The higher lactams preferably contain from 6 to 20 carbon atoms and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactam, and said salt can then be employed in the polymerization process in an equivalent amount to the anionic catalyst as set out herein above. This preliminary preparation is particularly desirable as it permits ready removal of hydrogen gas from the system as when sodium or sodium hydride is employed, removal of water as when sodium hydroxide is empolyed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly, acid anhydrides generate organic acids in the system which then require sufficient anionic catalyst to neutralize the organic acid in addition to the amount desired to function in the polymerization reactions.

This invention is particularly concerned with the above described low temperature anionic polymerization processes in which the polymerization is conducted below the melting point of the polymer, but above the melting point of the monomer. By controlling the temperature during polymerization in this manner, a change in state from a fully polymerized liquid polymer to a solid polymer is avoided as the melting point of the high polymer is avoided. The avoidance of molten polymer has great practical utility as it enables casting shaped articles from lactam monomers with the application of little or no pressure to the material within the mold. In contrast to this, it is generally necessary to apply considerable pressure during solidification when conventional nylon formation processes are used.

In conventional nylon pressure molding operations, the dimensions of the shaped article will tend to differ from those of the mold due to the following two phenomena:

(1) Volumetric shrinkage attendant with the change in state from liquid to solid polymer;

(2) Thermal shrinkage attendant with cooling the polymer from its solidification point to ambient temperatures.

Of these, the dimensional changes encountered with respect to a change of state is of considerably greater consequence than the dimensional change due to thermal contraction.

In polymerization casting, volumetric changes are also encountered, but they are somewhat different. First, volumetric shrinkage due to a change in state is avoided, but, instead, a volumetric shrinkage occurs as the monomer is converted into polymer. For convenience herein, this will be referred to as polymerization shrinkage.

Also, of course, during polymerization casting, thermal shrinkages occur due to a change from the polymerization temperatures to ambient temperatures. This is not as great, however, as the temperature shrinkages during conventional pressure forming since the polymerization temperature is below the melting point of the polymer and thus it is not necessary to cool the shaped article as many degrees as is otherwise the case.

It is readily apparent that the above referred to volumetric shrinkage will result in a discrepancy in the dimensions of the cast article from those of the mold. If desired, of course, the mold can be designed sufficiently oversized to enable formation of a cast article having the correct dimensions, but several other problems are encountered which cannot be so readily accommodated. For example, in addition to dimensional nonconformities, shrinkages in polymerization casting may cause voids at various portions of the shape and particularly at surface areas adjacent the upper portion of the mold. In addition to this, the dimensional change attendant with polymerization casting may cause stresses to be developed within the cast article. This latter effect can be particularly pronounced in those instances in which the polylactam is cast around a non-yielding mandrel having a significant diameter. As the lactam contracts upon polymerization, radial forces are developed within the polylactam article. These stresses naturally reduce the strength, such as impact, of cast articles, and their resistance to shock forces may be seriously impaired. In addition to such well known effects as stress crazing, such locked-in stresses may cause serious fractures of the cast article during machining operations wherein the cast article may shatter like brittle glass when contacted with a cutting tool.

Similarly, locked-in stresses can result when elongated articles are cast around an elongated mandrel. Here, in addition to radial stresses, stresses may develop in an axial direction.

Accordingly, it is an object of this invention to minimize the effect of polymerization shrinkage during the polymerization casting of polylactam shaped articles.

It is a further object of this invention to enable greater control over the dimensional tolerances of the cast articles prepared by the polymerization casting of lactams.

Yet another object of this invention is to avoid excessive void and bubble formation, particularly along upper surface areas, of articles cast by utilizing techniques for the polymerization casting of lactam articles.

Still another object of this invention is to avoid the formation of excessive stresses within articles cast during the polymerization casting of lactams.

Briefly, these and other objects are obtained by conducting the polymerization of lactams in a stagewise manner which enables the formation of a portion of a shaped article in solid form prior to complete polymerization to a solid state of the remaining portions of the shaped article. As more fully set forth below, this can be accomplished by charging the mold and polymerizing the monomer in more than one step, or by initiating the polymerization of the lactam monomer in a localized zone of the mold and permitting the reaction to propagate sequentially throughout the mold, or by a combination of these two procedures.

In the drawings:

FIG. 1 is a somewhat schematic view in section of a mold containing a partially cast shape in one stage of its preparation in accordance with one of the methods of this invention.

FIG. 2 is a somewhat schematic view in section of a mold containing a partially cast shape in one stage of its preparation in accordance with another method of this invention.

FIG. 3 is a somewhat schematic view in section of a mold charged with a lactam monomer preparatory to polymerization in accordance with yet another method of this invention.

FIG. 4 is a somewhat schematic view in section of a mold, including a riser, charged with a lactam monomer preparatory to polymerization in accordance with still another method of this invention.

FIG. 5 is a somewhat schematic view in section of a mold charged with a lactam monomer preparatory to polymerization in accordance with a still further method of this invention.

Referring now to the drawing, there is shown in FIG. 1 a mold indicated generally by reference numeral 10, this mold having any suitable cavity 11 formed therewithin, a pour opening 12 being provided for introducing a polymerizable material into the interior of the mold. In carrying out the invention, it is generally preferable to preheat the mold as by placing it in an oven or providing a heated jacket therefor to heat the mold to polymerization initiation temperatures. Alternatively, the mold need not be preheated, but is raised to initiation temperatures after it is charged with monomer.

The polymerizable material that is provided comprises a lactam monomer, a catalyst and a promoter. For convenience, this material is sometimes herein referred to as "reactive monomer." This mixture is introduced into the mold so as to fill the bottom portion of the mold and a body 15 is illustrated as comprising the initial portion of the mixture placed in the mold. For the purpose of illustration, it is assumed that the molded article is to have an over-all height of any arbitrary figure which may be designated $4x$. The initial portion 15 of reactive lactam monomer that is poured into the mold is adapted to fill a major portion of the mold cavity to a height which is indicated as being approximately $3x$. It will be understood that these figures are arbitrary and the intent is to illustrate that a major portion of the mold is initially charged with reactive monomer. After placing the reactive monomer in the mold and establishing polymerizing temperatures, a suitable time is allowed to enable the portion 15 to at least commence polymerization. An additional portion of reactive monomer is then introduced into the mold to contact portion 15 and is sufficient in quantity to fill the remaining portion of the mold as indicated by dimension $x$. The time of filling this remaining portion is not critical as long as the delay is long enough to permit the polymerization shrinkage of major portion 15 to take place. It is apparent that by these means the polymerization shrinkage of portion 15 will not affect the dimensions of the finished object as this shrinkage will be corrected for when the additional material is added to fill the mold.

It should here be mentioned that a several stage charging of a mold as above described need not adversely affect the soundness or strength of the finished casting for several reasons. Firstly, the lactam polymer is somewhat soluble in lactam monomer and secondly, if a second portion of monomer is added while active polymerization sites still remain on a first portion, a grafting of the polymeric chains of the several portions will result. While either one or both of these causes will result in firmly joined portions, the effect of the latter may be maximized if the second portion is poured over the first portion prior to the time that polymerization of the first portion has proceeded entirely to completion. It therefore may be desirable to time the addition of the second portion of the monomer to coincide with the substantial completion of polymerization shrinkage, but to precede the destruction of active polymerization sites on the exposed surface of the first portion as by completion of the polymerization or by reaction of the polymeric surface with atmospheric moisture, etc.

Referring now to FIG. 2 of the drawing, a further modified method of the invention is illustrated wherein it is desired to cast an elongated shape, such as a roll cover, around an axially positioned mandrel. In this modification, an open topped container or mold 20 is provided having a cylindrical inner portion. An axially positioned mandrel 21 is suitably mounted within the mold.

In this instance, a first portion of the reactive monomer 24 is poured into the mold for a height indicated by $y$ above the lower surface of the mold. This first portion of the mixture is introduced and heated sufficiently to cause the polymerization of portion 24 to commence. Subsequently, after polymerization shrinkage is substantially completed, an additional portion as indicated by reference numeral 25 is poured to thickness $y$ above the polymerized or plymerizing body 24 as discussed with reference to FIG. 1 above.

Portion 25 is allowed to polymerize until polymerizing shrinkage has occurred and this process is carried on in a stagewise manner by again introducing a portion of the reactive mixture into the next increment of space $y$ above the polymerized body 25 and so on until the mold is substantially filled.

By sequentially charging the mold 20 in this manner, stresses along the axis of the casting are greatly avoided as each segment y may axially contract and relieve itself before the next portion is poured into the mold. If, instead, the entire mold 20 is filled with reactive monomer in but a single step, the axial stresses may be considerable as the mandrel 21 may offer considerable resistance to the axial contraction of the cylinder—particularly so if the mandrel 21 contains any undercut portions at its ends.

Summarizing, the procedures shown in FIGS. 1 and 2 illustrate a method of stagewise casting wherein an initial portion of reactive monomer is introduced into the mold, it is partially polymerized, at least until polymerization shrinkage has begun, and then additional monomer is added to the mold. By this stagewise casting, polymerization shrinkages can be compensated for and some relaxation of the stresses occurs. Also, as mentioned above, a tight bond is achieved between the various interfaces since active polymerization sites may remain on the first poured portion of monomer and since the polymerized surface is solvated by the later added monomer.

By another method of this invention, the same general result is achieved by initially charging the entire mold with lactam monomer, initiating the polymerization reaction at a localized point within the mold, and permitting the reaction to progress sequentially throughout the rest of the mold. By these means, polymerization will be proceeding rapidly toward completion in the localized portion of the mold prior to the time that it has commenced at a remote portion of the mold.

Two convenient methods are available by which localized initiation can be accomplished. In the one method, heating elements are disposed at a localized region of the mold. Reactive lactam monomer is poured into the mold at temperatures somewhat below those necessary to cause rapid polymerization. The heating elements raise the monomer to polymerization temperatures at the localized region, and a localized reaction is initiated. By means of the heat supplied to the mold as well as the exothermic nature of the polymerization reaction, the reaction will progress sequentially throughout the entire mold.

Another method by which this localized initiation may be accomplished is comprised of pouring a lactam monomer into the mold, which lactam contains either a suitable promoter or catalyst, but not both. A frangible capsule containing the omitted reaction ingredient, i.e., either catalyst or promoter, is placed in a localized region of the filled mold and is broken or otherwise disintegrated to enable the omitted reaction ingredient to initiate the reaction. The reaction will be sequentially propagated throughout the entire mold by density differences and/or convection currents until a solid casting of polylactam is formed. The capsule containing the omitted reaction ingredient may, in addition to being frangible, be soluble in the monomer or soluble when the monomer is raised to reaction temperatures. By a still further modification, the omitted reaction ingredient may be added via a submerged orifice or conduit.

Referring now to FIG. 3 of the drawing, a method of the invention is illustrated for causing localized initiation of the polymerization and allowing the reaction to proceed sequentially throughout the mold. An open topped container 30 is provided as a mold and is supported upon suitable means which may include a heating element 31 for convenience. Lactam monomer is poured into mold 30, having an upper surface 33. This monomer contains either a suitable promoter or catalyst, but not both, and this is not reactive.

Within the lower portion of the mold 30 is a frangible capsule 35 that is filled with the omitted reaction ingredient, i.e., either promoter or catalyst. In carrying out the process, a suitable means, such as a rod, may be extended down within the mixture to fracture the frangible capsule 35. This, of course, releases the catalyst or promoter at the lower portion of the mold and rapidly initiates polymerization in this localized region. As the mixture beings to polymerize, the catalyst or promoter will migrate upwardly due to various density and thermal currents and, accordingly, the mixture within the mold will be sequentially polymerized, resulting in completion of the polymerization adjacent the localized region prior to such completion at more remote regions of the mold.

Alternatively, instead of utilizing a frangible capsule, suitable means such as a pipe or submerged orifice may be provided in communication with the interior of the lower portion of the mold 30 for introducing the omitted reaction ingredient into the lower region of the mold cavity.

Referring now to FIG. 4 of the drawing, another modification of this method of localized initiation is illustrated wherein a mold 40 is provided with a suitably shaped cavity 41. The pour opening of the mold is in communication with a conduit 42 which is connected with the lower portion of a feed tank 45. Disposed within this feed tank is a suitable mixture comprising a lactam and either a reaction promoter or a catalyst, but not both. This mixture extends downwardly within conduit 42 and fills the mold cavity 41. By providing the inlet conduit 42 and member 5, a continuous head is provided on the mixture within the cavity of the mold to insure that the interior of the mold is always provided with a fresh supply of the liquid lactam mixture to compensate for and fill any voids due to polymerization shrinkage. As such, the feed tank and conduit perform the function of a riser in a similar manner as known in the metallurgical casting art. Further, if desired, super-atmospheric pressures may be maintained above the surface of the monomer 43 to provide a positive force to keep the cavity 41 fully filled with monomer.

Disposed within a lower portion of the mold is a fusible capsule 47. This capsule is adapted to melt at approximately the polymerizing temperature of the mixture and, accordingly, when the mold is heated to the polymerizing temperature as is the case in each of the molds of the present invention, the fusible capsule 47 will melt, releasing the contents thereof. The omitted reaction ingredient is disposed within the capsule 47 such that upon melting of the capsule, the promoter or catalyst is released at the lower portion of the cavity. This will cause polymerization of the mixture in the lower portion of the cavity, and the promoter or catalyst will migrate through the mixture, causing the mixture within the mold to be sequentially polymerized in an upward direction. It is also apparent that the fusible capsule 47 can be substituted for by the frangible capsule described in FIG. 3.

Referring now to FIG. 5 of the drawing, a still further modified form of the invention is illustrated wherein a mold 50 is provided with an internal cavity 51 in communication with a pour opening 52. The mold 50 is filled with a reactive lactam monomer having an upper surface 53. A pair of heating means 55 and 56 are indicated schematically at the lower portion of the mold. In carrying out the method according to this form of the invention, a reactive mixture is introduced into the mold and the heating means 55 and 56 are then suitably energized so as to raise the temperature of the mixture at localized regions adjacent the lower portion of the mold to polymerizing temperatures that will cause monomer in these regions of mold 50 to polymerize. Since the polymerization reaction is exothermic, the remaining portions of the mixture may be progressively raised to the polymerizing temperature so as to polymerize the mixture within the mold sequentially in an upwardly direction until the entire article has been polymerized.

This succession of operations results in the same results as aforementioned so as to compensate for polymerization shrinkages and enable manufacture of articles to finer dimensional tolerances. The method also provides a means for preventing the establishment of high internal stresses in a cast article. Several different sequences of unique method steps are provided for causing this stagewise or sequential polymerization of the completed article, all of the various methods resulting in the same desired improved results.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A process for the polymerization of higher lactams by utilizing low temperature anionic polymerization processes conducted below the melting point of the polylactam, characterized in that the polymerization is initiated in a localized region of a mold and is permitted to progress sequentially throughout the mold by introducing a lactam monomer containing a promoter into said mold and sequentially discharging a catalyst into said monomer adjacent said localized region of said mold.

2. A process for the polymerization of higher lactams by utilizing low temperature anionic polymerization processes conducted below the melting point of the polylactam, characterized in that the polymerization is initiated in a localized region of a mold and is permitted to progress sequentially throughout the mold by introducing a lactam monomer containing a catalyst into said mold and sequentially discharging a promoter into said monomer adjacent said localized region of said mold.

3. The method of stagewise casting polylactam articles comprising providing a mold having a cavity therein of suitable configuration, providing a mixture including a monomer and a promoter, placing said mixture within the cavity of said mold, heating said mold to the polymerizing temperature of said mixture, and releasing a catalyst in a localized area of the cavity of said mold and allowing said catalyst successively and sequentially to initiate the polymerization of said monomer through said cavity.

4. The method of stagewise casting polylactam articles comprising providing a mold having a cavity therein of suitable configuration, providing a mixture including a monomer and a catalyst, placing said mixture within the cavity of said mold, heating said mold to the polymerizing temperature of said mixture, and releasing a promoter in a localized area of the cavity of said mold and allowing said promoter successively and sequentially to initiate the polymerization of said monomer through said cavity.

References Cited by the Examiner

UNITED STATES PATENTS

| | | | |
|---|---|---|---|
| 2,057,674 | 10/1936 | Fields | 264—331 |
| 2,063,315 | 12/1936 | Kuettel | 264—308 |
| 2,103,237 | 12/1937 | Deckert | 264—308 |
| 2,136,422 | 11/1938 | Fields | 264—308 |
| 2,136,424 | 11/1938 | Fields et al. | 264—308 |
| 3,018,273 | 1/1962 | Butler et al. | |

FOREIGN PATENTS 624,467    11/1962    Belgium.

ROBERT F. WHITE, *Primary Examiner.*

S. HELLER, R. B. MOFFITT, *Assistant Examiners.*